United States Patent [19]

Wright

[11] Patent Number: 4,991,394
[45] Date of Patent: Feb. 12, 1991

[54] HIGH PERFORMANCE TURBINE ENGINE

[75] Inventor: E. Scott Wright, Mesa, Ariz.

[73] Assignee: Allied-Signal Inc., Morris Township, Morris County, N.J.

[21] Appl. No.: 332,689

[22] Filed: Apr. 3, 1989

[51] Int. Cl.⁵ .............................................. F02C 3/04
[52] U.S. Cl. .................. 60/226.1; 60/39.07; 60/39.75; 60/39.83; 60/728
[58] Field of Search ................. 60/226.1, 39.83, 39.07, 60/39.75, 262, 728, 39.15

[56] References Cited

U.S. PATENT DOCUMENTS

| | | |
|---|---|---|
| 2,691,274 | 10/1954 | Whitney, Jr. . |
| 2,721,456 | 10/1955 | Whitney, Jr. . |
| 2,893,204 | 7/1959 | Anderson . |
| 3,080,728 | 3/1963 | Groves . |
| 3,083,532 | 4/1963 | Cook ................................. 60/728 |
| 3,314,649 | 4/1967 | Erwin et al. ........................ 415/178 |
| 3,475,906 | 11/1969 | Madelung .......................... 60/39.07 |
| 3,528,250 | 9/1970 | Johnson ............................. 60/266 |
| 3,651,645 | 3/1972 | Grieb ................................. 60/728 |
| 3,842,597 | 10/1974 | Ehrich ............................... 60/226.1 |
| 4,196,773 | 4/1980 | Trumpler ........................... 60/39.07 |
| 4,198,830 | 4/1980 | Campbell . |
| 4,254,618 | 3/1981 | Elovic ................................ 60/226.1 |
| 4,351,150 | 9/1982 | Schulze . |
| 4,503,666 | 3/1985 | Christoff . |
| 4,542,623 | 9/1985 | Hovan et al. ...................... 60/226.1 |
| 4,645,415 | 2/1987 | Hovan ............................... 60/39.83 |
| 4,761,947 | 8/1988 | Hennecke .......................... 60/39.75 |
| 4,825,643 | 5/1989 | Hennecke et al. ................. 60/39.83 |

FOREIGN PATENT DOCUMENTS 159626 7/1988 Japan ................................. 60/39.83

*Primary Examiner*—Donald E. Stout
*Attorney, Agent, or Firm*—Terry L. Miller; James W. McFarland; Robert A. Walsh

[57] ABSTRACT

A high performance turbine engine includes refrigeration apparatus powered by the engine and effective upon a fractional air flow received from the engine compressor to provide chilled air for cooling of internal engine components. The refrigeration process facilitates rejection of unwanted heat to ambient air despite high stagnation temperatures at high flight speeds. The invention allows increased turbine inlet temperature and improved fuel efficiency or thrust per pound of engine weight with present-day metals and cooling technology being used for engine construction.

15 Claims, 1 Drawing Sheet

FIG. 1
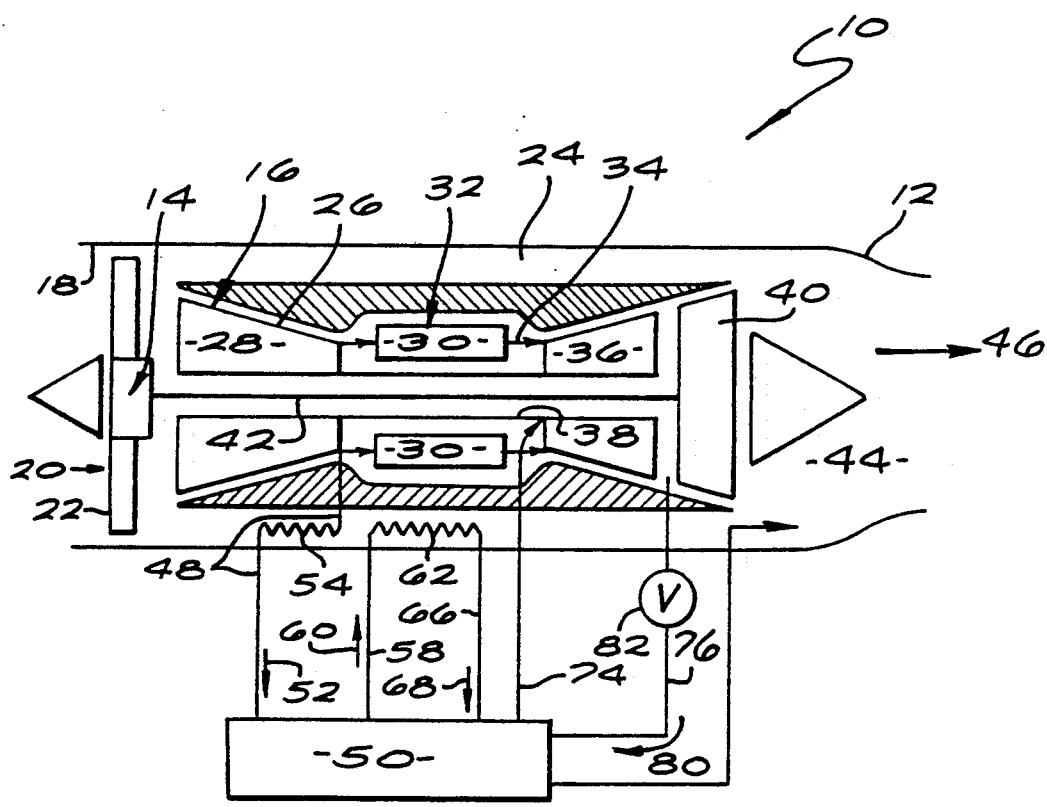
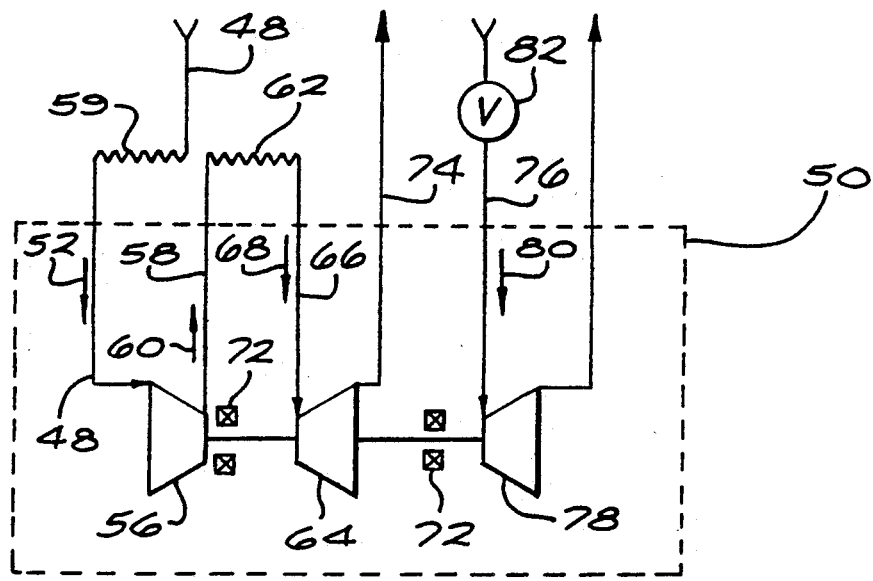
FIG. 2

HIGH PERFORMANCE TURBINE ENGINE

TECHNICAL FIELD

The present invention is in the field of turbine engines. Particularly the present invention relates to a high performance turbine engine which is particularly useful for propulsion of high speed aircraft. The present invention is directed to a high performance turbine engine having a particularly effective system for cooling the turbine of the engine.

BACKGROUND ART

A long-recognized need in the turbine engine art has been to attain higher operating temperatures in order to achieve a greater thermodynamic efficiency and an increased power output per unit of engine weight. Ideally, a turbine engine should operate with stoichiometric combustion in order to extract the greatest possible energy value from the fuel consumed. However, the temperatures resulting from stoichiometric and even near-stoichiometric combustion are beyond the melting points of present-day metallic turbine engine components. Consequently, as the turbine engine art has progressed, an ever greater emphasis has been placed upon both cooling techniques and the development of temperature and oxidation resistant metals for use in components of the engine which are exposed to the highest temperatures. That is, cooling techniques and high temperature metals have been developed for each of combustion chambers, turbine stator nozzles, and turbine blades of turbine engines. This quest has led to the development of cooling schemes for all of these components as well as to classes of nickel-based "super alloy" metals which may be cast using directionally solidified or single crystal techniques. All in all, the quest for higher operating temperatures in a turbine engine fabricated of metallic components has led to increasing complexity and expense in the making of the engine, with ever-diminishing return for these efforts.

Unfortunately, as aircraft flight speeds have increased, the ability to use ambient air as a cooling mechanism has decreased. That is, the stagnation temperature of the ambient air goes up with increasing flight speed so that the liberation of unwanted heat to this air is difficult. Conventional engine cooling schemes, therefore, become less effective as flight speed increases. Also, compressor discharge air is used for turbine cooling. Higher performance engines have used higher pressure ratio compressors which in conjunction with high flight speeds causes this difficulty.

Particularly in the area of cooling the engine turbine stator nozzles and turbine blades, this increase of compressor discharge and ambient stagnation temperatures has presented difficulties. Because high-speed aircraft demand high engine performance, the cycle pressure ratio within the engine must be comparatively high. Thus, compressor discharge temperature of a high performance engine at high flight speed may be expected to reach about 1400° F., or higher. Conventional wisdom, as evidenced by U.S. Pat. Nos. 3,528,250, issued 15 Sept. 1970, to D. Johnson: 4,254,618, issued 10 Mar. 1981, to Earnest Elovic: and 4,645,415, issued 24 Feb. 1987, to Edward J. Hovan, et al, teaches to reject heat from the pressurized compressor discharge air directly to ambient air, and then to use this somewhat cooled pressurized air for cooling within the engine. The limited effectiveness of this conventional cooling method for high flight speeds is recognized. For example, with compressor discharge temperature at 1400° F. or higher, and an ambient-air heat exchanger effecting a temperature reduction of 100° F. to 200° F., the difficulty of cooling turbine components which are at 1600° F. to 2000° F. with a flow of air at 1200° F. to 1300° F. is self-evident. The volume of cooling air required becomes prohibitive.

A conventional alternative is presented by U.S. Pat. No. 3,083,532, issued 2 Apr. 1963, to H. Cook. This teaching adds the use of evaporative cooling with an expendable liquid, such as water. However, the disadvantage of having to carry a supply of water, or other liquid, and the consequences of depleting the liquid supply at a critical time mitigate against this proposed solution.

Yet another conventional teaching is provided by U.S. Pat. No. 3,314,649, issued 18 Apr. 1967, to J. R. Erwin, et al, wherein a peripherally outer portion of a turbine disk at the shank portion of the turbine blades defines a recycling or Terry-type turbine. Hot pressurized air obtained from ram effect or from a compressor is directed upon the recycling turbine and delivers work to the turbine disk. It is asserted that the gas-expansion cooling effect results in cooling of the turbine disk and turbine blades thereon. Unfortunately, the teaching of this patent also would add weight and structural complexity where added weight cannot be tolerated, and where all available structure must be devoted to turbine blade retention. This teaching has not been accepted in the field as a solution to turbine cooling.

An alternative approach to the attainment of higher operating temperatures in a turbine engine has been recognized. This approach involves the use of high-strength ceramic components in the engine. Ceramic components are generally better able than metals to withstand the high temperature oxidizing environment of a turbine engine. However, the term "high strength" in connection with ceramic structures must be viewed in context. While many ceramic materials exhibit superior high temperature strength and oxidation resistance, ceramics have historically been difficult to employ in turbine engines because of a comparatively low tensile fracture strength and a low defect tolerance. Consequently, ceramic structures have not widely replaced metallic components in the turbine engine field.

DISCLOSURE OF THE INVENTION

The present invention contemplates a turbine engine in which a comparatively small fractional part of the compressor air flow is removed from the engine cycle path, a refrigeration cycle is carried out utilizing power from the engine to extract heat energy from this fractional air flow, and the cooled fractional air flow is then employed to cool turbine structure of the engine as it is returned to the engine cycle path.

An advantage of the present invention is that the refrigeration cycle raises the temperature of the heat energy to be removed from the fractional air flow so that this energy may be liberated via a heat exchanger to ambient air or fan duct air despite the high stagnation temperature of this ambient air at high flight speeds.

Yet another advantage of the present invention resides in the resulting ability to remove heat from the turbine components of the engine by use of the chilled fractional air flow. Because of the advantageous turbine cooling, the turbine inlet temperature may be increased considerably with present-technology metallic turbine blades. Stoichiometric or near-stoichiometric combustion may be possible through use of the present invention with metallic turbine blades of present directionally-solidified or single crystal materials.

Still further, an additional advantage of the invention results from the use of air-cycle refrigeration to effect the cooling of the fractional air flow. Air cycle refrigeration permits the refrigeration process to be carried out with comparatively light and small turbomachinery using only ambient air. That is, a phase-change or vapor cycle refrigeration process need not be used to practice the present invention, although in some cases such a vapor cycle refrigeration process may be preferred. A particularly advantageous aspect of air cycle refrigeration as contemplated by the present invention is the provision of power from the turbine engine to the refrigeration apparatus without the use of a mechanical linkage or drive shaft. Instead, a small portion of the motive fluid is extracted from the turbine engine cycle path, is expanded in a small turbine directly driving the refrigeration apparatus, and is returned to the turbine engine cycle path at a location downstream of its point of extraction.

BRIEF DESCRIPTION OF THE DRAWINGS

FIG. 1 schematically depicts a turbofan type of turbine engine embodying the invention; and FIG. 2 provides a schematic fragmentary view of an encircled portion of FIG. 1, which is comparatively enlarged to better depict the components of the invention.

BEST MODE OF CARRYING OUT THE INVENTION

FIG. 1 depicts in schematic form a dual-spool turbofan-type engine 10. The engine 10 includes a housing generally referenced with the numeral 12, and journaling therein a duality of concentric and axially nested shafts or spools 14, 16, which is conventional. The engine 10 defines an inlet 18 through which is inducted ambient air, as depicted by arrow 20. A fan 22, which is part of the spool 14, initially pressurized the inducted air. The fan 22 delivers this air partly to a bypass duct 24, and partly to a core engine flow path, which is generally referenced with the numeral 26.

In the core engine flow path 26, a core engine compressor 28 further pressurizes the received core engine air flow, and delivers this pressurized air to an annular combustor, generally referenced with the numeral 30. A flow of fuel 32 is added to the pressurized air in combustor 30, and supports combustion to provide a flow of hightemperature pressurized motive fluid, as depicted by arrow 34. A core engine high pressure turbine 36 expands the motive fluid 34 partially toward ambient, and drives the compressor 28 via a tubular shaft 38. Subsequently, a low-pressure turbine 40 further expands the motive fluid toward ambient and drives the fan 22 via a central shaft 42. Finally, the motive fluid flow exits the core engine flow path into a mixing region 44, which also receives the pressurized air flow from the fan bypass duct 24, and is exhausted from the engine 10, as depicted by arrow 46.

With attention now to FIGS. 1 and 2 in conjunction, it will be seen that the engine 10, also includes a conduit or flow path 48 communicating a fractional flow of pressurized air from compressor 28 to a refrigeration device generally referenced with the numeral 50, as is indicated by arrow 52. Interposed in the flow path 48, and disposed in the fan bypass duct 24, is a first heat exchanger 54. This first heat exchanger 54 liberates a portion of the heat of compression from the fractional air flow 52 into the air flow in the fan bypass duct 24.

The fractional air flow 52 after being partially cooled in heat exchanger 54 is received by an air cycle compressor 56, which pressurizes the fractional air flow to increase both its temperature and pressure. The pressurized air from compressor 56 is delivered via a conduit 58, as depicted by arrow 60, to a second heat exchanger 62. The second heat exchanger 62 is disposed in the fan bypass duct 24 in order to liberate a portion of the heat of compression supplied to the functional air flow by compressor 56 into the air flow within duct 24. Subsequent to the second heat exchanger 62, the partially cooled fractional air flow now at a pressure above compressor discharge pressure of engine 10 is delivered to an air cycle turbine 64 by a conduit 66, as indicated by arrow 68.

Air cycle turbine 64 expands the pressurized and partially cooled fractional air flow to a lower pressure and lower temperature, and provides shaft power to compressor 56 via a shaft 70 carried in bearings 72. From the air cycle turbine 64, the chilled fractional air flow is communicated to the turbine engine 10 via a conduit 74 for use in cooling the structures of turbine 36. Internal structures and flow paths for communicating cooling air to turbines is well known in the turbine engine art, and need not be described in detail here. It should suffice to point out that the present invention provides a cooling air flow for use in cooling the turbine 36 which is of considerably lower temperature than the known art would make possible. When this considerably cooler air flow is used as conventionally known to cool the turbine structure 36, a considerably increased ability to cool the structure is realized. The result is that the inlet temperature of motive gasses 34 flowing to turbine 36 may be considerably increased while using present-day metallurgy for the turbine structures.

By way of example only, if the cooling effectiveness N of the turbine structure is defined conventionally as:

$$N = \frac{Tg - Tm}{Tg - Tc}$$

where Tg is temperature of the gas flow at the structure, Tm is the bulk temperature of the metal of the structure, and Tc is temperature of the cooling air flow. Then for a constant Tm with N=0.6, which is representative of present cooling technology:

$$Tg = \left(\frac{1}{1-n}\right)Tm - \left(\frac{n}{1-n}\right)Tc$$

$$\delta Tg/\delta Tc = -\frac{n}{1-n}$$

$$= -\frac{.6}{.4} = -1.5$$

This means that for every 100° F. Tc is reduced, and this is with only 5%–10% of the core airflow being used for cooling, Tg may be increased 150° F. If Tc is reduced from 1200° F. to 800° F., Tg could be increased from 2500° F. to 3100° F. with the same technology level in metallurgy and cooling. Actually the air cycle will allow cooling to lower the fan duct temperature, to less than 400° F., for example, which would boost the allowable Tg to 3700° F., or near stoichiometric.

In order to make up for the power difference between that required to drive the compressor 56, and the power realized from turbine 64, a conduit 76 extends from the core engine flow path intermediate of the high-pressure turbine 36, and low-pressure turbine 40. A fractional flow of the motive fluid is extracted via the conduit 76, and flows to a second air cycle turbine, as indicated by arrow 80. The second turbine expands this fractional motive fluid flow toward ambient and provides the necessary additional shaft power to balance the power absorption of compressor 56. In order to control the refrigeration device 50, a control valve 82 is disposed in the conduit 76. From the second air cycle turbine 78 the partially spent motive fluid is returned to the fan bypass duct 24 or to mixing region 44. In this regard it is important to note that thermal energy from both the heat exchangers 54 and 62, as well as the partially spent motive fluid which is employed to drive turbine 78, is returned to the cycle path of the engine 10. The net result because of higher permissible turbine inlet temperatures is an increased power output and/or fuel efficiency for the engine 10, which more than offsets the added weight and power requirement of the refrigeration device 50.

While the present invention has been described by reference to a preferred embodiment which employs air-cycle refrigeration, it is apparent that phase-change or vapor cycle refrigeration could be used, and may be preferable in certain applications. Also, the power necessary to operate the refrigeration cycle may be provided by means other than the flow of motive fluid and secondary turbine presently depicted. A shaft power connection might be used, or an electric motor could provide the additional power input required by the refrigeration apparatus.

Also while ideally suited to a low bypass ratio turbofan, the concept of chilling the turbine cooling air to any high output engine cycle requiring high cycle temperatures would be similarly beneficial. This would include high OCR turboshaft, turboprop, prop-fan and high BPR turbofans as well as, to a lesser extent, turbojet engines.

What is claimed is:

1. A turbine engine comprising a compressor inducting ambient air and delivering this air pressurized to a combustor, means for introducing fuel to said combustor to sustain combustion producing a flow of high-temperature pressurized combustion products, a turbine receiving said high-temperature pressurized combustion products for expanding the latter toward ambient and drivingly connecting with said compressor, and refrigeration means for receiving both a fractional flow of said pressurized air and power input from said engine driving a refrigeration cycle cooling said fractional air flow, and means for applying said cooled fractional air flow to a rotating turbine blade of said turbine.

2. The invention of claim 1 further including means for controlling said power input from said engine to said refrigeration means.

3. A turbine engine having a compressor section, a combustor, and a turbine section drivingly connecting with said compressor section, said compressor section inducting ambient air and delivering this air pressurized to said combustor, means for introducing fuel to said pressurized air in said combustor maintaining combustion and providing a flow of high temperature pressurized combustion products to said turbine section, said turbine section expanding said combustion products to ambient and powering said compressor section; air cycle refrigeration means for cooling said turbine section and including an air cycle compressor, heat liberating means, and an air cycle turbine drivingly connecting with said air cycle compressor, said air cycle compressor receiving a flow of said pressurized air from said compressor and delivering this air further pressurized to said heat liberating means, said heat liberating means partially cooling said further pressurized air and delivering the latter to said air cycle turbine, said air cycle turbine expanding said further pressurized air to a comparatively lower pressure and further cooled temperature and providing shaft power to said air cycle compressor, and conduit means delivering said further cooled air flow to said turbine section for cooling the latter.

4. A high performance turbine engine comprising a compressor inducting ambient air and delivering this air pressurized to a combustor, means for introducing a flow of fuel to said pressurized air in said combustor, said combustor maintaining combustion providing a flow of hightemperature pressurized motive fluid, a turbine expanding said flow of high-temperature pressurized motive fluid toward ambient and driving said compressor, a refrigeration cycle device receiving a fractional flow of said pressurized air from said compressor, power transfer means receiving power from said turbine engine for delivering power to said refrigeration device, said refrigeration device extracting heat-of-compression energy from said fractional flow of pressurized air to provide a flow of comparatively cool pressurized air, and means for applying said flow of comparatively cool pressurized air to a rotating turbine blade of said turbine for cooling thereof.

5. A turbine engine comprising a compressor inducting ambient air and delivering this air pressurized to a combustor, means for introducing fuel to said combustor to sustain combustion producing a flow of high-temperature pressurized combustion products, a turbine receiving said high-temperature pressurized combustion products for expanding the latter toward ambient and drivingly connecting with said compressor, and refrigeration means for receiving both a fractional flow of said pressurized air and power input from said engine driving a refrigeration cycle cooling said fractional air flow, and means for applying said cooled fractional air flow to a rotating turbine blade of said turbine, wherein said power input from said engine includes a fractional flow of said pressurized combustion products, and a second turbine expanding said fractional flow of combustion products toward ambient and drivingly connecting with said refrigeration means.

6. The invention of claim 5 wherein said refrigeration means includes air cycle compressor means for further pressurizing said fractional air flow, heat exchanger means for extracting heat from said further pressurized fractional air flow to provide a partially cooled and further pressurized fractional air flow, and an air cycle turbine means expanding said partially cooled and further pressurized fractional air flow to provide said cooled fractional air flow and drivingly connecting with said air cycle compressor.

7. The invention of claim 6 wherein said second turbine is drivingly connected with said air cycle compressor.

8. The invention of claim 5 further including pre-cooling heat exchanger means interposed between said compressor and said refrigeration means for removing at least a portion of the heat-of-compression temperature imparted to said fractional air flow by said compressor.

9. The invention of claim 8 wherein said turbine engine is a turbofan type having a fan bypass duct, and said pre-cooling heat exchanger is exposed to bypass air flow in said fan bypass duct.

10. The invention of claim 9 wherein said precooling heat exchanger is disposed in said fan bypass duct.

11. The invention of claim 5 further including control valve means opening and closing said fractional flow of pressurized combustion products to said second turbine.

12. A turbine engine having a compressor section, a combustion, and a turbine section drivingly connecting with said compressor section, said compressor section including ambient air and delivering this air pressurized to said combustor, means for introducing fuel to said pressurized air in said combustor maintaining combustion and providing a flow of high temperature pressurized combustion products to said turbine section, said turbine section expanding said combustion products to ambient and powering said compressor section; air cycle refrigeration means for cooling said turbine section and including an air cycle compressor, heat liberating means, and an air cycle turbine drivingly connecting with said air cycle compressor, said air cycle compressor receiving a flow of said pressurized air from said compressor and delivering this air further pressurized to said heat liberating means, said heat liberating means partially cooling said further pressurized air and delivering the latter to said air cycle turbine, said air cycle turbine expanding said further pressurized air to a comparatively lower pressure and further cooled temperature and providing shaft power to said air cycle compressor, and conduit means delivering said further cooled air flow to said turbine section for cooling the latter, further including a second air cycle turbine drivingly connected with said air cycle turbine, and means for providing a flow of pressurized combustion products to said second air cycle turbine, said second air cycle turbine expanding said combustion products toward ambient pressure and providing shaft power to said air cycle compressor.

13. The invention of claim 12 wherein said turbine engine includes a fan bypass duct communicating a flow of air from a fan portion of said compressor to ambient, said heat liberating means including a heat exchanger communicating said flow of further pressurized air and being in heat transfer relation with said flow of air in said fan bypass duct.

14. The invention of claim 12 wherein said air cycle refrigeration means includes pre-cooling second heat liberating means disposed intermediate said compressor and said air cycle compressor with respect to said flow of pressurized air therebetween.

15. The invention of claim 12 further including a control valve interposed in said means for providing a flow of pressurized combustion products to said second air cycle turbine.

* * * * *